Sept. 11, 1962 W. R. KLAHN 3,053,368
ROLLER CONVEYOR TABLES AND THE LIKE
Filed Sept. 26, 1961
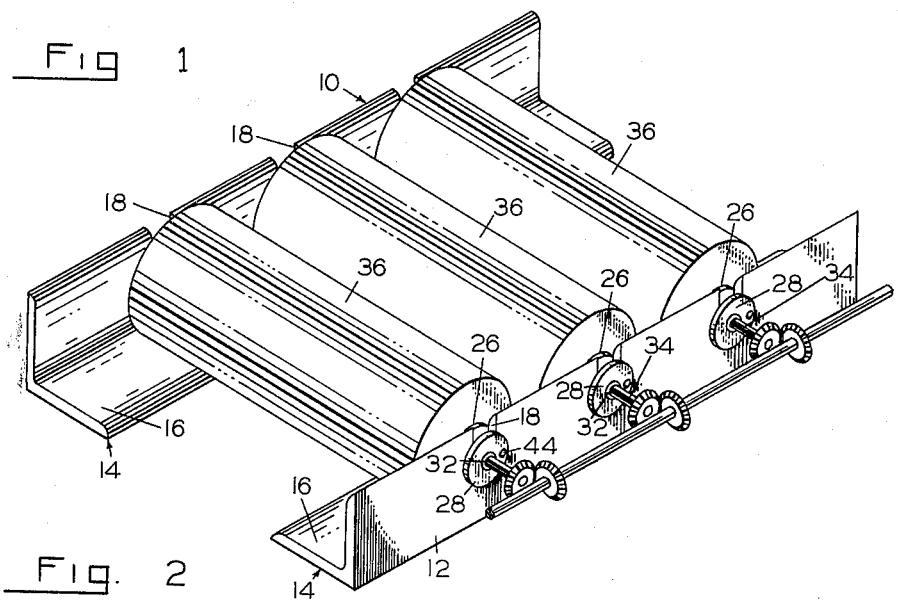
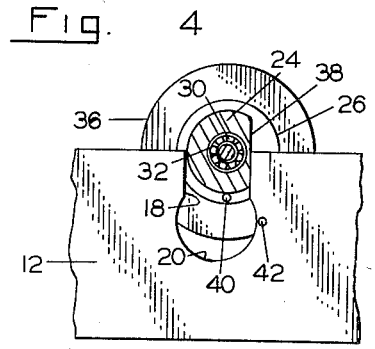
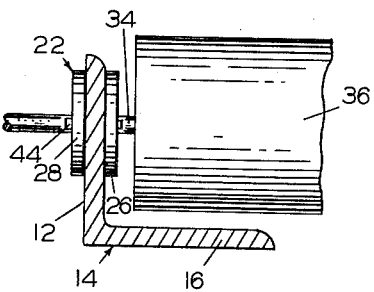
INVENTOR.
WILLIAM RUSSELL KLAHN
BY Walter Lenca
ATTORNEY

United States Patent Office 3,053,368
Patented Sept. 11, 1962

3,053,368
ROLLER CONVEYOR TABLES AND THE LIKE
William Russell Klahn, Lake County, Ind., assignor of one-half to Stanley Klahn, Lake County, Ind.
Filed Sept. 26, 1961, Ser. No. 140,811
6 Claims. (Cl. 193—35)

This invention relates generally to roller conveyor tables and more particularly to the manner of mounting rollers therein.

Generally, conventional roller conveyor tables are comprised of a plurality of spaced pillow blocks aligned in parallel rows and secured to a foundation or supporting frame. These pillow blocks are usually provided with semi-circular recesses for receiving bearing members which are secured in place by caps bolted to the pillow blocks. The axle or shaft of each of the rollers are journalled in a pair of axially aligned bearing members.

It frequently happens that a roller shaft will bind in the bearing members if not properly lubricated at regular intervals, or the roller shaft or the bearing member may break down for the above or numerous other reasons, which in any event immobilizes the rollers. The practice in the art is to allow a certain number of rollers in the conveyor line to be out of operation until time is available to make the necessary repairs, which generally means replacing the defective roller assemblies. Making replacements necessitates working a plurality of bolts to remove and assemble the caps and bearing members to the pillow blocks and consequently is time consuming and requires the shutting down of the conveyor line. Though it is tolerated, this practice is not desired because it lowers the efficiency of the roller conveyor table, causes the product conveyed thereby to deviate to one side or the other, in some cases the product is marked by the immobilized rollers causing defects in the product, and in general, causes a bottleneck condition which affects the entire production process.

Accordingly, I have invented a roller conveyor table, the parts of which are of such construction and arrangement that a defective roller assembly may be easily and quickly removed from the conveyor table and replaced with an operable roller assembly.

Another object of my invention is to provide a bearing holder for a roller conveyor table which may be easily and simply secured to the frame member of the conveyor table.

Still another object of my invention is to provide a roller conveyor table which is simple and economical to manufacture and to maintain.

Other objects and advantages of this invention will become apparent from a careful study of the following detailed description and drawings in which a preferred embodiment is described and illustrated, wherein:

FIGURE 1 is a symmetrical view of a portion of the roller conveyor table constructed in accordance with the principles of my invention, FIGURE 2 is an end view of a bearing holder mounted in locked position in the frame member of the conveyor table, FIGURE 3 is a side view of the bearing holder and frame member sectioned along line 3—3 of FIGURE 2, and FIGURE 4 is a sectional view of the bearing holder shown in pivoted position as it is assembled to the frame member.

Referring now in detail to the drawings, numeral 10 designates generally the roller conveyor table constructed in accordance with the principles of my invention. It comprises spaced, parallel plate members 12 vertically supported on a supporting frame or foundation (not shown). An economical and simple construction is illustrated in FIGURES 1 and 3 wherein I show vertical plate members 12 as the upright sides of angle bars 14. The other sides 16 of angle bars 14 lay horizontally and are secured to a foundation or a supporting frame in any convenient manner. Each of vertical plate members 12 are provided with spaced slots 18 each thereof extending from the top edge thereof and terminating with a circular enlargement 20 which pivotally receives therein a bearing holder 22. Bearing holder 22 comprises a cylindrical body 24 having flanges or collars 26 and 28 adjacent the ends thereof and an axial hole 30 therethrough for receiving bearing means 32 in which an end of axle 34 of a roller 36 is journalled. Bearing means 32, of course, may include any of the roll type bearings, sleeve bearings or a bearing surface depending upon the use to which the conveyor line will be put. The cylindrical body 24 is formed with a planular surface or flat side 38. The diametral dimension of the cylindrical body 24 perpendicular to the planular or flat side 38 is less than the width of slot 18 so as to allow said body 24 to slide into slot 18 when the bearing holder 22 is positioned with its said planular side 38 parallel to said slot 18 as illustrated in FIGURE 4. The diametral dimension of said cylindrical body 24 parallel to the planular side 38 is such as to allow rotation thereof in circular enlargement 20 and prevent movement in slot 18 when bearing holder 22 is positioned with its said planular side 38 angled from the parallel with said slot 18 as illustrated in FIGURE 2. I provide holes 40 and 42 in one or both of collars 26 and 28 and each plate member 12 respectively for receiving a retaining pin 44 upon alignment of said holes 40 and 42.

In accordance with the principles of any invention, I provide the parts of my invention described above for arrangement as follows to construct a roller conveyor line very easily and economically. I secure to a foundation or supporting frame, slotted, generally vertically positioned plate members 12 in spaced and parallel relation with slots 18 laterally aligned. I provide each bearing holder 22 with a bearing 32 and mount said bearing holders 22 on axles 34 of rollers 36. I then place each of rollers 36 in the conveyor line by sliding the bearing holders 22 in aligned slots 18 of plate members 12 and lock the rollers in place by rotating the bearing holders 22 in the circular enlargements 20 at the terminal end of said slots 18 so that the planular sides 38 of said bearing holders 22 are normal to said slots 18. Bearing holders 22 are retained in their locked position by inserting retaining pins 44 in aligned holes 40 and 42.

When it is desired to remove a roller from the conveyor line, it is merely necessary to remove the retaining pin 44 from holes 40 and 42, rotate each bearing holder 22 in circular enlargements 20 so that the planular sides 38 thereof are parallel to slots 18 and lift the roller assembly from the vertical plate members 12.

It is apparent from the foregoing that the roller conveyor table of my invention may be easily and cheaply constructed and readily maintained. Any roller, whether an idler or a driven roller may be easily and rapidly replaced in the conveyor line.

While I have shown and described only a certain preferred embodiment of the invention, it is apparent that modifications may arise. Therefore, I do not wish to be limited to the disclosure set forth but only by the scope of the appended claims.

I claim:

1. A roller supporting frame for a roller conveyor table comprising vertical plate members in spaced relation, each of said plate members having a plurality of spaced slots, each of said slots terminating in the body of said plate members with a circular enlargement, a cylindrical bearing holder in said circular enlargement and pivotable therein, said cylindrical bearing holder formed with a planular surface, said cylindrical bearing holder movable through said slot when said planular surface is parallel to said slot and immovable through said slot when said planular surface is angled from the parallel with said slot.

2. A roller supporting frame for a roller conveyor table comprising plate members in spaced, parallel relation, said plate members having a plurality of laterally aligned slots, each of said slots terminating in the body of said plate members with a circular enlargement, a cylindrical bearing holder in said circular enlargement and pivotable therein, said bearing holder having a collar for butting against said plate member to prevent axial movement, the cylindrical surface of said bearing holder including a planular surface, said bearing holder movable through said slot when said planular surface is parallel to said slot and immovable through said slot when said planular surface is angled from the parallel with said slot, and pivot locking means for said bearing holder.

3. A roller conveyor table comprising spaced angle bars, the horizontal member of said angle bars adapted for connection to supporting means, the vertical member of said angle bars having a plurality of laterally aligned slots, each of said slots terminating in the body of said vertical member with a circular enlargement, a cylindrical bearing holder in said circular enlargement and pivotable therein, said bearing holder having a collar for butting against said vertical member, a hole axially therethrough, bearing means in said hole, the cylindrical surface of said bearing holder including a planular surface, said bearing holder movable through said slot when said planular surface is parallel to said slot and immovable through said slot when said planular surface is angularly displaced from the parallel with said slot, pivot locking means for said bearing holder, and roller means including oppositely extending axles journalled in said bearing means.

4. A roller conveyor table comprising angle bars in spaced, parallel relation, the horizontal members of said angle bars adapted for connection to supporting means, the vertical members of said angle bars having a plurality of laterally aligned slots, each of said slots terminating in the body of said vertical members with a circular enlargement, a tubular member in said circular enlargement and pivotable therein, said tubular member having end collars to prevent axial movement in said circular enlargement, the cylindrical surface of said tubular member including a planular surface, said tubular member movable in said slot when said planular surface is parallel to said slot and immovable in said slot when said planular surface is angularly displaced from the parallel with said slot, pivot preventing means for said tubular member, and roller means including oppositely extending axles journalled in said tubular members.

5. A roller conveyor table comprising angle bars in spaced, parallel relation, the horizontal members of said angle bars adapted for connection to supporting means, the vertical members of said angle bars having a plurality of laterally aligned slots, each of said slots terminating in the body of said vertical members with a circular enlargement, each of said laterally aligned circular enlargements supporting a roller carrying shaft, said shaft in said circular enlargements pivotable therein and having a planular face, said shaft being movable in said slots when said planular face is parallel to said slots and being immovable in said slots when said planular face is angularly displaced from the parallel with said slots, and pivot preventing means for said shaft.

6. A shaft supporting bearing mount comprising a pair of spaced plate members, each of said plate members having a slot, the terminal of said slot being circularly enlarged, a cylindrical bearing member in said circular enlargement and pivotable therein, the cylindrical surface of said bearing member including a planular surface, said bearing member movable in said slot when said planular surface is parallel to said slot and immovable in said slot when said planular surface is angularly displaced from the parallel with said slot, and pivot preventing means for said bearing member.

No references cited.